(12) United States Patent
Yamamoto et al.

(10) Patent No.: US 10,464,151 B2
(45) Date of Patent: Nov. 5, 2019

(54) RACEWAY GROOVE MACHINING METHOD, BEARING, BALL SCREW DEVICE, MACHINE AND VEHICLE PRODUCTION METHOD

(71) Applicant: NSK LTD., Tokyo (JP)

(72) Inventors: Masahito Yamamoto, Fujisawa (JP); Hiroshi Koyama, Fujisawa (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 16/081,291

(22) PCT Filed: Sep. 29, 2017

(86) PCT No.: PCT/JP2017/035415
§ 371 (c)(1),
(2) Date: Aug. 30, 2018

(87) PCT Pub. No.: WO2018/074186
PCT Pub. Date: Apr. 26, 2018

(65) Prior Publication Data
US 2019/0015916 A1    Jan. 17, 2019

(30) Foreign Application Priority Data
Oct. 18, 2016  (JP) .................................. 2016-204621

(51) Int. Cl.
| | |
|---|---|
| B23G 1/22 | (2006.01) |
| B23P 15/00 | (2006.01) |
| B24B 39/02 | (2006.01) |
| F16C 33/64 | (2006.01) |
| F16H 25/24 | (2006.01) |
| F16C 33/58 | (2006.01) |

(52) U.S. Cl.
CPC .............. *B23G 1/22* (2013.01); *B23P 15/003* (2013.01); *B24B 39/02* (2013.01); *F16C 33/64* (2013.01);
(Continued)

(58) Field of Classification Search
CPC .. B23G 1/22; B23P 9/04; B23P 15/003; B24B 19/022; B24B 39/02; F16C 33/64;
(Continued)

(56) References Cited

U.S. PATENT DOCUMENTS

| | | | |
|---|---|---|---|
| 3,579,911 A | 5/1971 | Steinmetz | |
| 3,696,483 A | 10/1972 | Burk | |
| 6,019,517 A * | 2/2000 | Katsuki | ............... B21K 1/04 384/516 |

FOREIGN PATENT DOCUMENTS

| | | |
|---|---|---|
| EP | 0 665 392 A1 | 8/1995 |
| JP | 52-94855 A | 8/1977 |

(Continued)

OTHER PUBLICATIONS

Communication dated Mar. 27, 2018, from the Japanese Patent Office in counterpart application No. 2017-566883.
(Continued)

*Primary Examiner* — John C Hong
(74) *Attorney, Agent, or Firm* — Sughrue Mion, PLLC

(57) ABSTRACT

There is provided a method for processing a raceway groove configured to circumferentially form a to-be-processed side raceway groove on a surface to be processed of a workpiece, the to-be-processed side raceway groove is configured to be brought into rolling contact with a rolling element, and the surface to be processed is a cylindrical circumferential surface. The method for processing a raceway groove includes: arranging a processing rolling element rotatably between the to-be-processed side raceway groove and a tool side circumferential surface which is opposed to the surface to be processed and which is a cylindrical circumferential surface of a machining tool; rotating the machining tool relatively with respect to the workpiece; and performing a burnishing process on the to-be-processed side raceway groove.

9 Claims, 10 Drawing Sheets

(52) U.S. Cl.
CPC ............ *F16H 25/24* (2013.01); *F16C 33/585* (2013.01); *F16C 2220/44* (2013.01); *F16H 2025/2481* (2013.01)

(58) Field of Classification Search
CPC ............................ F16C 2223/30; F16C 33/585; F16C 2220/44; F16H 25/24; F16H 2025/2481
See application file for complete search history.

(56) References Cited

FOREIGN PATENT DOCUMENTS

| | | |
|---|---|---|
| JP | 2000-312943 A | 11/2000 |
| JP | 2004-100667 A | 4/2004 |
| JP | 2004-100867 A | 4/2004 |
| JP | 2004-204911 A | 7/2004 |
| JP | 2004-223656 A | 8/2004 |
| RU | 2452608 C1 | 6/2012 |

OTHER PUBLICATIONS

International Search Report (PCT/ISA/210), issued by International Searching Authority in corresponding International Application No. PCT/JP2017/035415, dated Nov. 21, 2017.

Written Opinion (PCT/ISA/237) issued by the International Searching Authority in corresponding International Application No. PCT/JP2017/035415, dated Nov. 21, 2017.

European Search Report issued in European Patent Application No. 17861832.8 dated Sep. 17, 2019.

* cited by examiner

RACEWAY GROOVE MACHINING METHOD, BEARING, BALL SCREW DEVICE, MACHINE AND VEHICLE PRODUCTION METHOD

TECHNICAL FIELD

The present invention relates to an improvement of a method for processing a raceway groove configured to be brought into rolling contact with a rolling element, on a surface to be processed, which is a cylindrical circumferential surface, of a workpiece, such as a ball nut or a ball screw shaft configuring a ball screw device, and an outer ring or an inner ring configuring a rolling bearing. The present invention further relates to methods for manufacturing a bearing, a ball screw device, a machine and a vehicle.

RELATED ART

For example, a ball screw device as described in Patent Document 1 is incorporated in various kinds of mechanical devices including a movable portion that moves linearly, such as a machine tool. FIGS. 7 and 8 show an example of a conventional structure described in Patent Document 1 as a so-called piece type ball screw device. A ball screw device 1 includes a ball screw shaft 2, a ball nut 3, and a plurality of balls 4, 4. The ball screw shaft 2 is formed into a circular cross section and a linear rod shape by an iron-based metal steel material, such as carbon steel. On an outer circumferential surface of the ball screw shaft 2, inner diameter side ball screw grooves 5 having a partial circular arc shaped cross section are provided at equal pitches (the same lead) in an axial direction in a state of being a spiral shape and continuous over a plurality of circumferences.

The ball nut 3 is formed by fitting (press-fitting) and fixing a substantially oblong-shaped piece 7 into each of substantially oblong-shaped through holes provided at a plurality of axial positions of a nut body 6. Outer diameter side ball screw grooves 8, 8 having a partial circular arc shaped cross section are formed at a plurality of axial positions of an inner circumferential surface at equal pitches in the axial direction. Each of the outer diameter side ball screw grooves 8, 8 is configured by a ball rolling groove portion 9 spirally formed on the inner circumferential surface of the ball nut 3, and a ball return groove portion 10 formed into a substantially S shape on an inner circumferential surface of the piece 7. Namely, in a state in which the piece 7 is fitted and fixed into the through holes of the nut body 6, both circumferential end portions of the ball rolling groove portion 9 are connected with each other through the ball return groove portion 10. A depth of the ball return groove portion 10 is deeper than a depth of the ball rolling groove portion 9. Besides, the plurality of balls 4, 4 are arranged between each of the outer diameter side ball screw grooves 8, 8 and the inner diameter side ball screw groove 5 so as to be freely rollable.

When the ball screw device 1 is used for driving a driven object such as a tool table or a moving table of a machine tool, the ball screw shaft 2 is only rotatably supported to a frame or the like, and the ball screw shaft 2 is rotatable by a predetermined amount in both directions by a servo motor or the like. In contrast, the ball nut 3 is supported and fixed to the driven object. When the ball screw shaft 2 is driven to be rotated, each of the balls 4, 4 rolls between the ball rolling groove portion 9 configuring each of the outer diameter side ball screw grooves 8, 8 and the inner diameter side ball screw groove 5. At this time, when reaching a terminal end portion (one circumferential end portion) of the ball rolling groove portion 9, the balls 4, 4 are returned to a starting end portion (the other circumferential end portion) of the same ball rolling groove portion 9 through the ball return groove portion 10. As a result, the driven object supporting and fixing the ball nut 3 can be moved in parallel in a direction corresponding to a rotation direction of the ball screw shaft 2 by a length corresponding to a rotation amount.

In a case of manufacturing the ball nut 3 configuring the ball screw device 1, firstly, casting, forging or the like is performed on a metal material such as carbon steel to obtain a substantially cylindrical intermediate material. Next, by a cutting process such as lathe turning using a planet cutter (planet tap), each of the outer diameter side ball screw grooves 8, 8 is formed on an inner circumferential surface of the intermediate material while leaving a certain stock removal (machining allowance). Further, after applying heat treatment such as quenching or tempering, finish machining such as grinding, polishing, or superfinishing is performed on each of the outer diameter side ball screw grooves 8, 8 to remove the stock removal, thereby obtaining the ball nut 3. The method for manufacturing the ball nut 3 has room for improvement from a viewpoint of suppressing manufacturing cost.

CITATION LIST

Patent Document

Patent Document 1: JP-A-2004-204911

SUMMARY OF THE INVENTION

Problems to be Solved

In view of the above circumstances, the present invention has been made to realize a method for processing a raceway groove which can reduce processing cost.

Means for Solving Problems

The method for processing a raceway groove of the present invention relates to a workpiece such as a ball nut or a ball screw shaft configuring a ball screw device, and an inner ring or an outer ring configuring a rolling bearing. The method for processing a raceway groove of the present invention is a method which, on a cylindrical circumferential surface (inner circumferential surface or outer circumferential surface) of a workpiece, forms a raceway groove (outer diameter side ball screw groove or inner diameter side ball screw groove, and inner ring raceway or outer ring raceway) configured to be brought into rolling contact with a rolling element such as a ball (ball), a cylindrical roller, and a tapered roller.

In particular, the method for processing a raceway groove of the present invention includes a step of performing a burnishing process on a to-be-processed side raceway groove by rotating a machining tool relative to a workpiece, in a state where at least one, preferably a plurality of processing rolling elements are rollably arranged between the to-be-processed side raceway groove and a tool side circumferential surface which is opposed to a surface to be processed and a cylindrical circumferential surface of the machining tool.

In a case of performing the method for processing a raceway groove of the present invention, it is preferable that the processing rolling elements are made of a material harder than a material configuring the workpiece. Besides, it is preferable to mirror finish a rolling surface of each of the processing rolling elements.

In the case of performing the method for processing a raceway groove of the present invention, specifically, the workpiece is a ball nut for a ball screw device of which the inner circumferential surface that is the surface to be processed, is spirally provided with an outer diameter side ball screw groove that is a to-be-processed side raceway groove and has a partial circular arc shaped cross section. Besides, the machining tool is a mandrel whose outer circumferential surface is the tool side circumferential surface. In a state in which a processing ball that is a processing rolling element is rollably arranged between the outer diameter side ball screw groove and the outer circumferential surface of the mandrel, the burnishing process is performed on the outer diameter side ball screw groove by relatively displacing the mandrel and the ball nut in the axial direction while relatively rotating the mandrel and the ball nut.

Preferably, an outer diameter of at least a part of the mandrel in the axial direction is increased toward the rear in a direction of relative displacement in the axial direction of the mandrel with respect to the ball nut during the burnishing process.

Alternatively, the outer circumferential surface of the mandrel is spirally provided with a tool side ball screw groove having a partial circular arc shaped cross section.

Preferably, a groove bottom diameter of the tool side ball screw groove is increased toward the rear in the direction of the relative displacement in the axial direction of the mandrel with respect to the ball nut during the burnishing process.

For example, the ball nut may be formed by fitting (press-fitting) and fixing a piece into into each of through holes provided at a plurality of positions of a nut body, and the outer diameter side ball screw groove can be configured by a ball rolling groove portion which is spirally formed on an inner circumferential surface of the nut body, and a ball return groove portion whose groove depth is deeper than that of the ball rolling groove portion and which is formed into a substantially S shape on an inner circumferential surface of the piece. Namely, the ball nut can be incorporated into a so-called piece type ball screw device.

Besides, the outer diameter side ball screw groove can be formed in a state of being a spiral shape on an inner circumferential surface of the ball nut and continuous over a plurality of circumferences. Namely, the ball nut can also be incorporated in a so-called end cap type, return tube type, or guide plate type ball screw device.

In the case of performing the method for processing a raceway groove of the present invention, alternatively, the workpiece can be an outer ring for a rolling bearing of which an inner circumferential surface, which is the surface to be processed, is provided with an outer ring raceway which is the to-be-processed side raceway groove.

Besides, the workpiece can also be an inner ring for a rolling bearing of which an outer circumferential surface, which is the surface to be processed, is provided with an inner ring raceway which is the to-be-processed side raceway groove.

In the case of performing the method for processing a raceway groove of the present invention, more specifically, after the to-be-processed side raceway groove is formed on the surface to be processed by a cutting process such as lathe turning using a planet cutter (planet tap), the to-be-processed side raceway groove is subjected to the burnishing process.

In the case of performing the present invention, after the to-be-processed side raceway groove is formed on the surface to be processed by the cutting process, and further after heat treatment such as quenching or tempering is applied to the workpiece, the to-be-processed side raceway groove is subjected to the burnishing process.

Effect of the Invention

The method for processing a raceway groove of the present invention performs the burnishing process in which the rolling surface of the processing rolling element is pressed against the to-be-processed side raceway groove while being brought into rolling contact with the to-be-processed side raceway groove. Accordingly, a surface property of the to-be-processed side raceway groove can be adjusted while denting a surface of to-be-processed side raceway groove. Further, in a previous step of the burnishing process, surface modification such as oxidation occurring on the surface of the to-be-processed side raceway groove, deformation (distortion) and surface roughness of the to-be-processed side raceway groove can be efficiently corrected. Therefore, finishing machining such as grinding, polishing or superfinishing can be omitted, or can be simplified even when it is applied, so that it is possible to reduce processing cost of the to-be-processed side raceway groove, and consequently manufacturing cost of the workpiece.

DETAILED DESCRIPTION OF EMBODIMENTS

Hereinafter, embodiments of a method for processing a raceway groove of the present invention will be described in detail with reference to the drawings. Additionally, the present invention relates to a workpiece such as a ball nut or a ball screw shaft configuring a ball screw device, and an outer ring or an inner ring configuring a rolling bearing. The present invention is characterized in that, in a workpiece, when forming a to-be-processed side raceway groove on a surface to be processed which is a cylindrical circumferential surface, by performing a burnishing process in which a rolling surface of a processing rolling element is pressed against the to-be-processed side raceway groove while being brought into rolling contact with the to-be-processed side raceway groove, it is possible to reduce processing cost of the to-be-processed side raceway groove, and consequently manufacturing cost of the workpiece. The configurations of a completed workpiece and a ball screw device or a rolling bearing incorporating the workpiece are the same as those of conventionally known various structures.

In the following description of the embodiments, a case where an outer diameter side ball screw groove is formed on an inner circumferential surface of a ball nut configuring a so-called piece type ball screw device will be described.

First Embodiment

Figure 1:
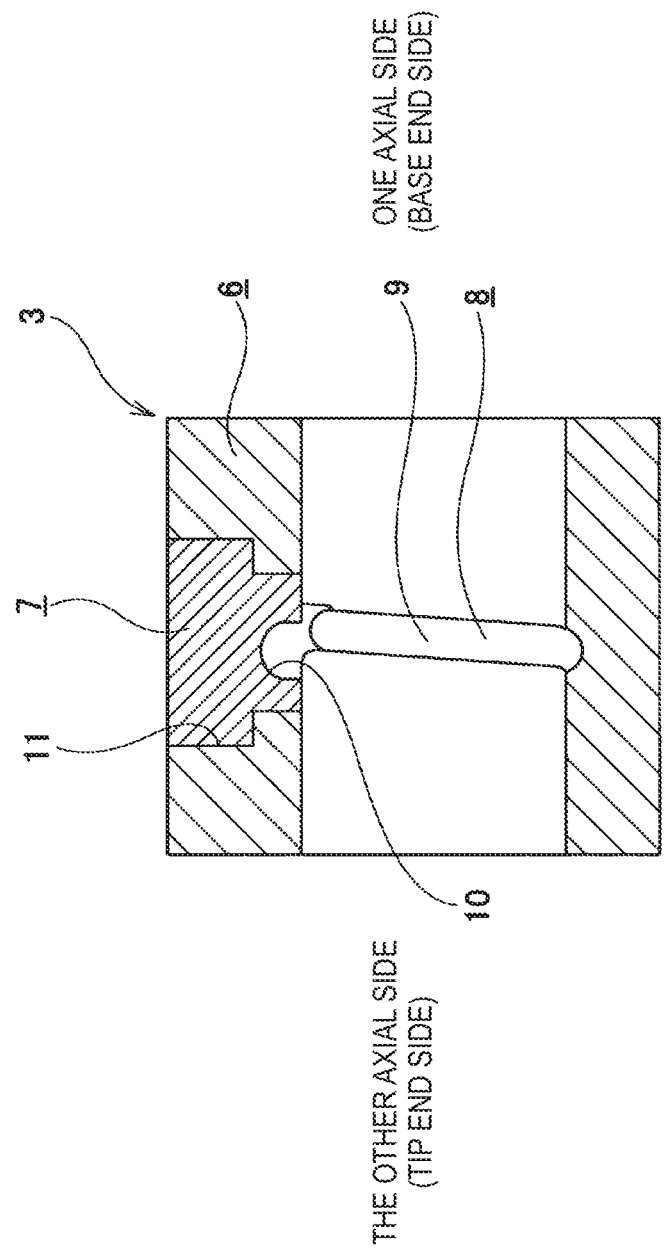
FIG. 1 is a view showing a part of a cross section in an axial direction of a ball nut for a ball screw device which is an object of a first embodiment of the present invention.
Figure 2:
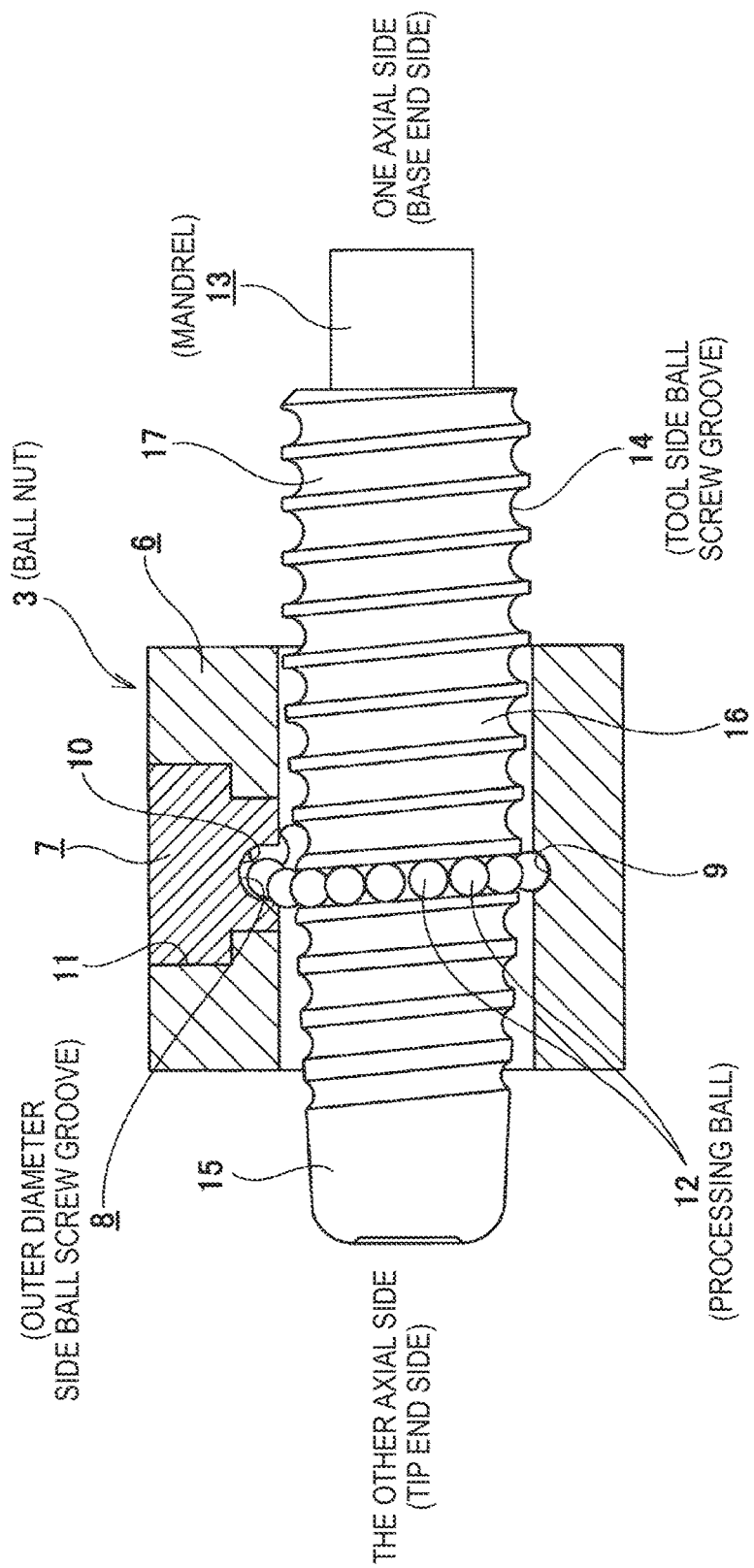
FIG. 2 is a sectional view showing a part in the axial direction in a state where a burnishing process is performed on an outer diameter side ball screw groove according to the first embodiment of the present invention.
Figure 3:
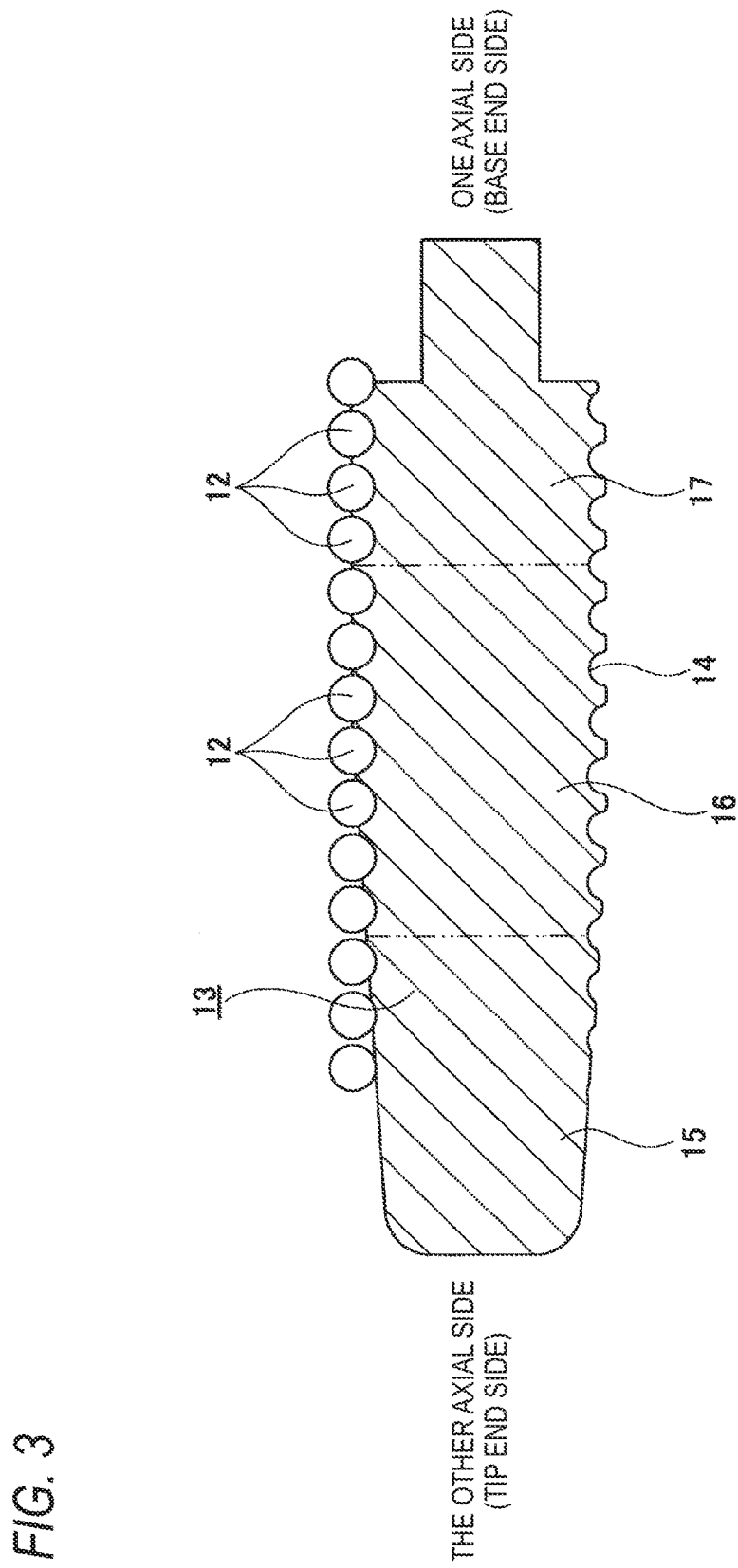
FIG. 3 is a sectional view showing a mandrel taken out according to the first embodiment of the present invention.
Figure 4:
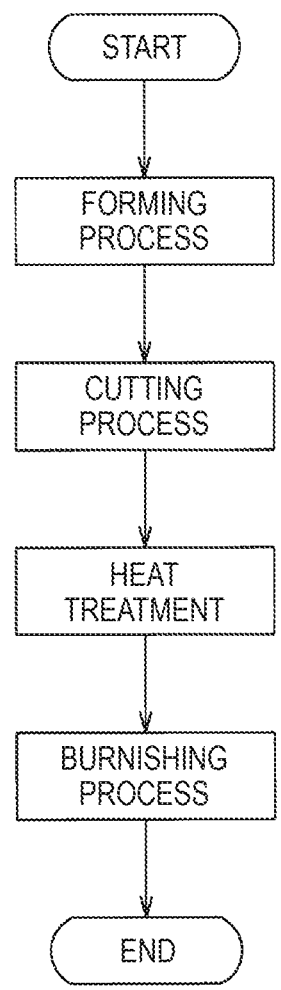
FIG. 4 is a flow chart showing a process for manufacturing the ball nut according to the first embodiment of the present invention.
Figure 7:
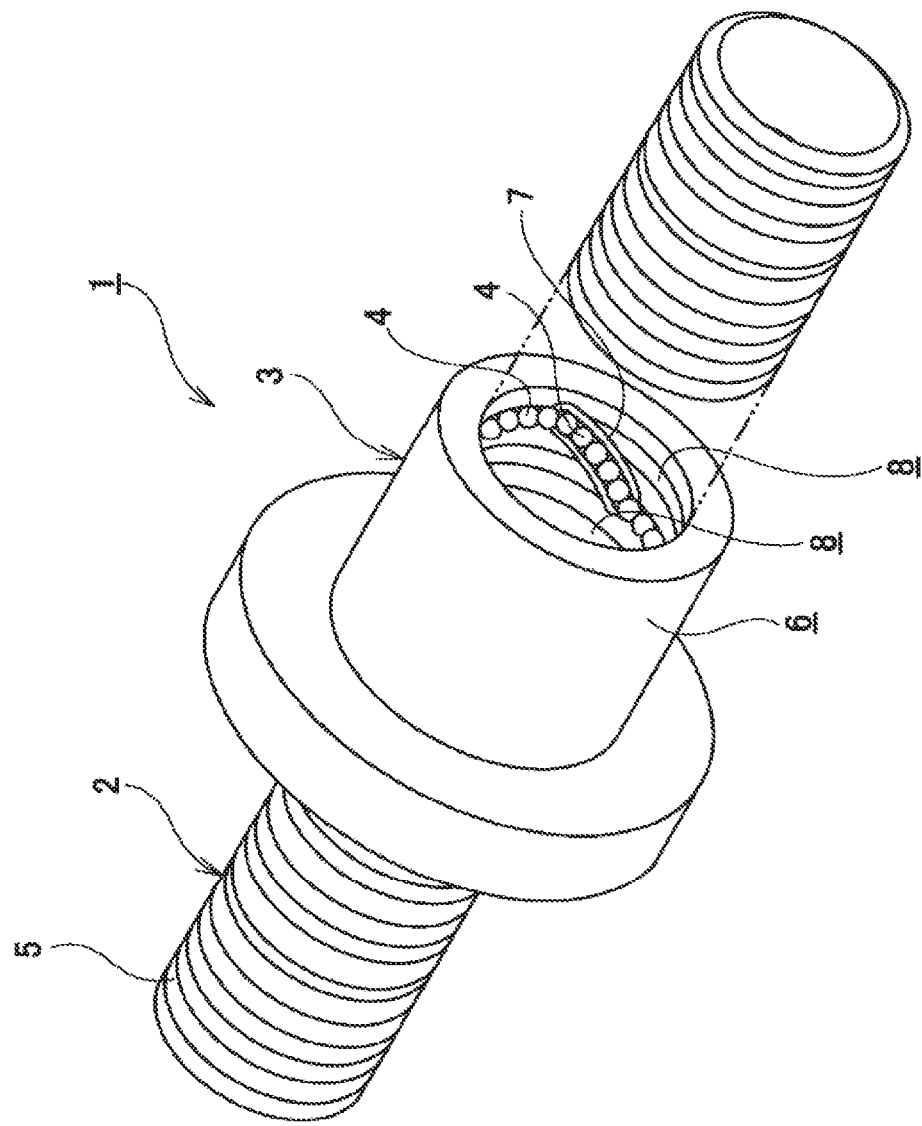
FIG. 7 is a perspective view showing a conventional ball screw device in a state of omitting a part of a ball screw shaft.
Figure 8:
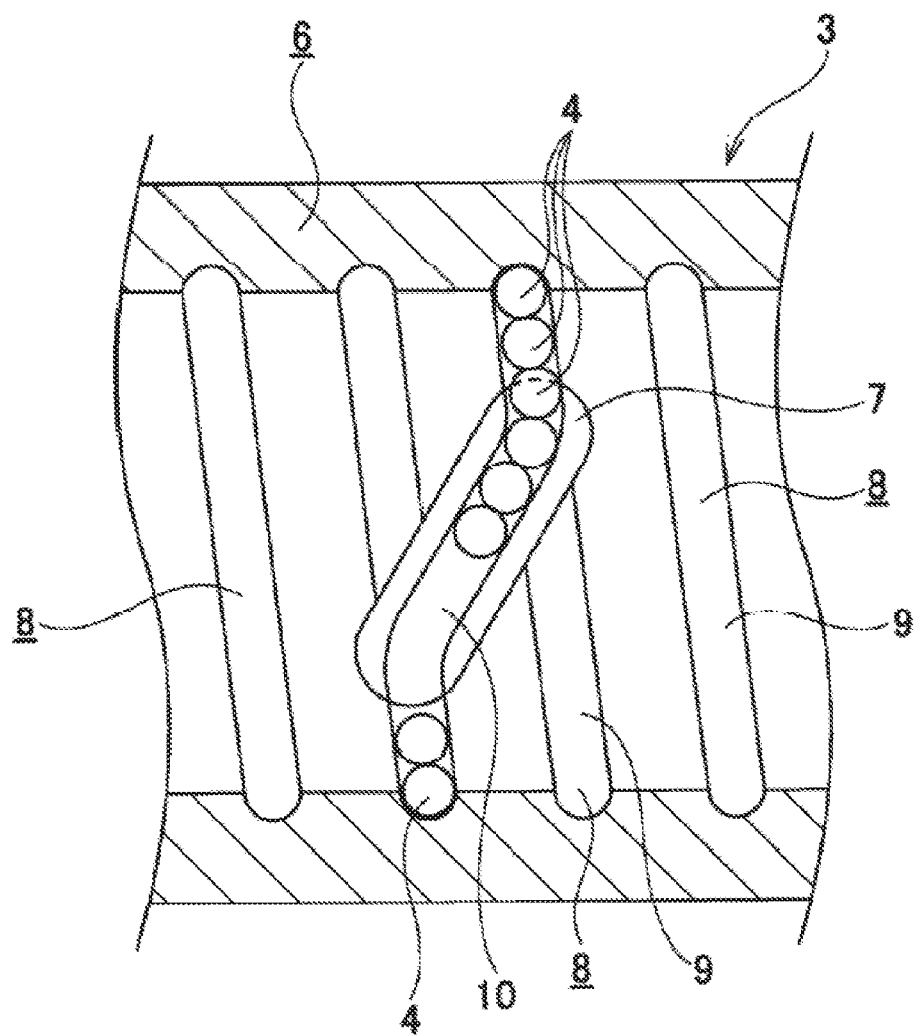
FIG. 8 is a sectional view of a ball nut of the conventional ball screw device.

A first embodiment of the present invention will be described with reference to FIGS. 1 to 4. Additionally, FIGS. 1 and 2 show a state in which a part (one lead portion) of a ball nut 3 to be an object of the embodiment is taken out. Similarly to the conventional structure shown in FIGS. 7 and 8, in addition to the ball nut 3, a ball screw device 1 includes a ball screw shaft 2, and a plurality of balls 4, 4. The ball screw shaft 2 is formed into a circular cross section and a linear rod shape by an iron-based metal steel material, such as carbon steel. On an outer circumferential surface of the ball screw shaft 2, inner diameter side ball screw grooves 5 having a partial circular arc shaped cross section are provided at equal pitches (the same lead) in an axial direction in a state of being a spiral shape and continuous over a plurality of circumferences.

The ball nut 3 is formed by fitting (press-fitting) and fixing a substantially oblong-shaped piece 7 into each of oblong-shaped through holes 11 provided at a plurality of axial positions of a nut body 6. Outer diameter side ball screw grooves 8, 8 having a partial circular arc shaped cross section are provided at a plurality of axial positions of an inner circumferential surface at equal pitches in the axial direction. Additionally, the through holes 11 are provided in the nut body 6 at equal intervals in the axial direction and in a state in which a phase with respect to a circumferential direction is shifted between the through holes 11 adjacent at least in the axial direction. Each of the outer diameter side ball screw grooves 8, 8 is configured by a ball rolling groove portion 9, and a ball return groove portion 10. The ball rolling groove portion 9 is spirally provided on an inner circumferential surface of the nut body 6. A circumferential length of the ball rolling groove portion 9 is slightly shorter than that of one round of the inner circumferential surface of the nut body 6 (shorter in the circumferential direction by a circumferential length of the ball return groove portion 10). The ball return groove portion 10 is provided in a substantially S shape on an inner circumferential surface of the piece 7, and connects with both circumferential end portions or portions close to both circumferential ends of the ball rolling groove portion 9 in a state in which the piece 7 is fitted and fixed into the nut body 6. A groove depth of the ball return groove portion 10 is deeper than a groove depth of the ball rolling groove portion 9. Each of the plurality of balls 4, 4 are arranged between each of the outer diameter side ball screw grooves 8, 8 and the inner diameter side ball screw groove 5 so as to be freely rollable.

When the ball screw device 1 is used for driving a driven object such as a tool table or a moving table of a machine tool, the ball screw shaft 2 is only rotatably supported to a frame or the like, and the ball screw shaft 2 is rotatable by a predetermined amount in both directions by a servo motor or the like. In contrast, the ball nut 3 is supported and fixed to the driven object. When the ball screw shaft 2 is driven to be rotated, each of the balls 4, 4 rolls between the ball rolling groove portion 9 configuring each of the outer diameter side ball screw grooves 8, 8 and the inner diameter side ball screw groove 5. At this time, when reaching a terminal end portion (one circumferential end portion) of the ball rolling groove portion 9, the balls 4, 4 are returned to a starting end portion (the other circumferential end portion) of the same ball rolling groove portion 9 through the ball return groove portion 10. In short, the balls 4, 4 reaching the terminal end portion of the ball rolling groove portion 9 are guided by the ball return groove portion 10 so as to get over a thread of the inner diameter side ball screw groove 5, and return the starting end portion of the same ball rolling groove portion 9. In this way, the balls 4, 4 roll while circulating between each of the outer diameter side ball screw grooves 8, 8 and the inner diameter side ball screw groove 5. Therefore, the driven object supporting and fixing the ball nut 3 is moved in parallel (displaced in the axial direction) in a direction corresponding to a rotation direction of the ball screw shaft 2 by a length corresponding to a rotation amount.

In order to manufacture the ball nut 3 configuring the ball screw device 1, firstly, by subjecting a metal material such as carbon steel to a forming process such as casting or forging, a substantially cylindrical intermediate material including the substantially oblong-shaped through holes 11 at a plurality of axial positions is obtained. Next, by a cutting process such as lathe turning using a planet cutter (planet tap), the ball rolling groove portion 9 configuring each of the outer diameter side ball screw grooves 8, 8 is formed on an inner circumferential surface of the intermediate material while leaving a certain denting margin. Subsequently, heat treatment such as quenching or tempering is applied to the intermediate material. Thereafter, the piece 7 including the ball return groove portion 10 having a substantially S shape on the inner circumferential surface, which is prepared (made) separately from the intermediate material, is fitted (press-fitted) and fixed into each of the through holes 11, and the terminal end portion and the starting end portion (both circumferential end portions) of the ball rolling groove portion 9 are connected with each other to configure each of the outer diameter side ball screw grooves 8, 8. Additionally, each of the through holes 11 may be formed at the same time as forming the metal material, or may also be formed by cutting after applying the forming process to the metal material. Alternatively, each of the through holes 11 may be formed by cutting the intermediate material, after forming the ball rolling groove portion 9 on the inner circumferential surface or after further applying the heat treatment after forming the ball rolling groove portion 9.

Further, each of the outer diameter side ball screw grooves 8, 8 is subjected to a burnishing process which characterizes the present invention. Firstly, grease is applied to each of the outer diameter side ball screw grooves 8, 8, and a plurality of processing balls 12, 12 are arranged in each of the outer diameter side ball screw grooves 8, 8 for the outer diameter side ball screw grooves 8, 8. Alternatively, the plurality of processing balls 12, 12 applied with the grease may be arranged in each of the outer diameter side ball screw grooves 8, 8 for the outer diameter side ball screw grooves 8, 8. In any case, each of the processing balls 12, 12 is held in each of the outer diameter side ball screw grooves 8, 8 in a state of preventing dropping out from each of the outer diameter side ball screw grooves 8, 8 by a viscosity of the grease. The processing balls 12, 12 are made of a material such as a metal or ceramic which is harder than the metal material configuring the ball nut 3, and a surface (rolling surface) thereof is mirror-finished. Besides, a ball diameter of each of the processing balls 12, 12 is set to be the same as a ball diameter of each of the balls 4, 4 incorporated in the completed ball screw device 1.

Furthermore, the ball nut 3 is supported by a processing device in a state of preventing axial displacement and rotation. A mandrel 13 having a circular cross section and a linear rod shape is inserted into an inner diameter side of the ball nut 3 from an opening on one axial side (a right side opening in FIG. 2) of the ball nut 3 while being rotated in a predetermined direction with a rotating device (not shown). In the mandrel 13, an introduction portion 15 is provided at a tip end portion (the other axial end portion, a left end portion in FIGS. 2 and 3), a main processing portion 16 is provided at an axial intermediate portion, and a finishing portion 17 is provided at a base end portion (one axial end portion, a right end portion in FIGS. 2 and 3). A tool side ball screw groove 14 having a partial circular arc shaped cross section is provided at equal pitches (the same lead) in the axial direction on an outer circumferential surface of a portion from one axial end side portion of the introduction portion 15 to one axial end edge of the finishing portion 17, in a state of being a spiral shape and continuous over a plurality of circumferences. Additionally, in FIG. 3, a boundary between the introduction portion 15 and the main processing portion 16, and a boundary between the main processing portion 16 and the finishing portion 17 are indicated by a chain double-dashed line, respectively. An outer diameter of a portion of the mandrel 13 (which is an outer diameter at a place where the tool side ball screw groove 14 are not provided) from a tip end edge of the introduction portion 15 to one axial end edge of the main processing portion 16 is gradually enlarged toward one axial side. Besides, a lead of the tool side ball screw groove 14 is the same as a lead of the inner diameter side ball screw groove 5 provided on the outer circumferential surface of the ball screw shaft 2 incorporated in the completed ball screw device 1. Moreover, a groove bottom diameter of a portion of the tool side ball screw groove 14, which is provided from one axial end side portion of the introduction portion 15 to one axial end edge of the main processing portion 16, is gradually enlarged from a front side to a rear side (from the other axial side to one axial side) in an insertion direction of the mandrel 13 with respect to the ball nut 3. A groove bottom diameter of a portion of the tool side ball screw groove 14 positioned at one axial end edge of the introduction portion 15 is made smaller than a diameter of an inscribed circle of each of the processing balls 12, 12 held in each of the outer diameter side ball screw grooves 8, 8. However, the tool side ball screw groove 14 may not be provided on an outer circumferential surface of the introduction portion 15 but provided on an outer circumferential surface of a portion from the other axial end edge of the main processing portion 16 to one axial end edge of the finishing portion 17. Additionally, an outer diameter of a tip end surface of the mandrel 13 is made smaller than a groove bottom diameter of a portion of the tool side ball screw groove 14 positioned at one axial end edge of the introduction portion 15. On the other hand, a groove bottom diameter of a portion of the tool side ball screw groove 14 provided on the finishing portion 17 is the same in the axial direction of the finishing portion 17.

When surfaces of the outer diameter side ball screw grooves 8, 8 are burnished using the mandrel 13, firstly, the tip end portion (the introduction portion 15) of the mandrel 13 is inserted into the inner diameter side of the ball nut 3 from the opening on one axial side of the ball nut 3. In the present embodiment, the outer diameter of the portion of the mandrel 13 from the tip end edge of the introduction portion 15 to one axial end edge of the main processing portion 16 is gradually enlarged toward one axial side. Besides, the groove bottom diameter of the portion of the tool side ball screw groove 14 positioned at one axial end edge of the introduction portion 15 is made smaller than the diameter of the inscribed circle of each of the processing balls 12, 12 held in each of the outer diameter side ball screw grooves 8, 8, and the outer diameter of the tip end surface of the mandrel 13 is made further smaller than the groove bottom diameter of the portion of the tool side ball screw groove 14 positioned at one axial end edge of the introduction portion 15. Accordingly, it is possible to improve workability of an operation of inserting the tip end portion of the mandrel 13 into the inner diameter side of the ball nut 3 (axial alignment operation between the mandrel 13 and the ball nut 3).

The tip end portion (the introduction portion 15) of the mandrel 13 is further displaced (the main processing portion 16 and the finishing portion 17 of the mandrel 13 are inserted into the inner diameter side of the ball nut 3) toward the other axial direction in the state of being inserted into the inner diameter side of the ball nut 3 while being rotated in the predetermined direction. Accordingly, each of the processing balls 12, 12 rolls while circulating between each of the outer diameter side ball screw grooves 8, 8 and the tool side ball screw groove 14. As described above, when each of the processing balls 12, 12 rolls, a surface of each of the processing balls 12, 12 is pressed against each of the outer diameter side ball screw grooves 8, 8 (against the ball rolling groove portion 9 configuring each of the outer diameter side ball screw grooves 8, 8). In the present embodiment, a groove bottom diameter of a portion of the tool side ball screw groove 14 from one axial end side portion of the introduction portion 15 to one axial end side portion of the main processing portion 16 is gradually enlarged from the other axial side to one axial side. Therefore, a force for pressing the surfaces of the processing balls 12, 12 against the outer diameter side ball screw grooves 8, 8 is larger as the mandrel 13 is displaced toward the other axial direction, during a period in which the processing balls 12, 12 are rolling between each of the outer diameter side ball screw grooves 8, 8 and a portion of the tool side ball screw groove 14 provided at the main processing portion 16. As the mandrel 13 is rotated in the predetermined direction with respect to the ball nut 3 and displaced in the other axial direction, a surface of each of the outer diameter side ball screw grooves 8, 8 can be gradually dented (pressure deformation by a dented amount) by the processing balls 12, 12.

Further, in the present embodiment, the groove bottom diameter of the portion of the tool side ball screw groove 14 provided on the finishing portion 17 is the same in the axial direction of the finishing portion 17. Accordingly, by further displacing the mandrel 13 in the other axial direction while rotating the mandrel 13 in the predetermined direction with respect to the ball nut 3, when the processing balls 12, 12 are rolled between each of the outer diameter side ball screw grooves 8, 8 and the portion of the tool side ball screw groove 14 provided on the finishing portion 17, the surfaces of the outer diameter side ball screw grooves 8, 8 can be smoothed.

Additionally, an amount of deformation (an amount of denting the surface of each of the outer diameter side ball screw grooves 8, 8 (denting margin)) in the groove bottom diameter of the portion of the tool side ball screw groove 14 from one axial end side portion of the introduction portion 15 to one axial end edge of the main processing portion 16 is appropriately determined according to hardness and a type (model number) of a metal material configuring the ball nut 3, an order of steps performed before and after the burnishing process, or the like. A groove bottom diameter of a portion of the tool side ball screw groove 14 positioned at one axial end edge of the main processing portion 16 is appropriately determined by taking account of a groove bottom diameter of each of the completed outer diameter side ball screw grooves 8, 8, a ball diameter of each of the balls 14, 14, an elastic deformation amount (spring back) of the ball nut 3 during the burnishing process, or the like. During the burnishing process, the piece 7 to be combined with the nut body 6 can be used the same one as that to be incorporated into the completed ball nut 3, or can also be used to specialize for processing. Besides, in the present embodiment, since a cross sectional shape of the tool side ball screw groove 14 is a partial circular arc shape, load resistance of the tool side ball screw groove 14 can be improved. However, the cross sectional shape of the tool side ball screw groove 14 can also be a Gothic arch shape. In this case, a positioning accuracy of each of the processing balls 12, 12 in the axial direction and a radial direction can be easily ensured, and a dimensional accuracy and a shape accuracy of each of the outer diameter side ball screw grooves 8, 8 can be easily ensured.

As described above, after performing the burnishing process on the outer diameter side ball screw grooves 8, 8, the ball nut 3 is displaced in one axial direction (a direction in which an insertion amount of the mandrel 13 into the ball nut 3 decreases) while rotating the mandrel 13 in a direction opposite to the predetermined direction, and the mandrel 13 is pulled out from the inner diameter side of the ball nut 3. Subsequently, each of the processing balls 12, 12 is taken out from each of the outer diameter side ball screw grooves 8, 8, cleaning, finishing machining, or the like are performed as necessary to complete the manufacturing work of the ball nut 3.

In the present embodiment, after each of the outer diameter side ball screw grooves 8, 8 (the ball rolling groove portion 9 configuring each of the outer diameter side ball screw grooves 8, 8) is formed by the cutting process, and further the ball nut 3 is subjected to the heat treatment, the outer diameter side ball screw grooves 8, 8 are subjected to the burnishing process. Therefore, finishing machining such as grinding, polishing with a grinding stone, and superfinishing can be omitted, or can be simplified (a grinding amount or a polishing amount is suppressed to be small) even when it is applied, so that it is possible to reduce the processing cost of each of the outer diameter side ball screw grooves 8, 8, and consequently manufacturing cost of the ball nut 3.

During the cutting process or the heat treatment, which is a previous step of the burnishing process, there is a possibility that surface modification such as oxidation occurs on the surfaces of the outer diameter side ball screw grooves 8, 8, and the outer diameter side ball screw grooves 8, 8 are deformed (distorted) to deteriorate a lead accuracy. In this case where the outer diameter side ball screw grooves 8, 8 are formed only by the cutting process, surface roughness of each of the outer diameter side ball screw grooves 8, 8 cannot be sufficiently reduced, and further, when the heat treatment is applied, the surfaces of the outer diameter side ball screw grooves 8, 8 become rough, and there is a possibility that the surface roughness is deteriorated. When the surface modification, deformation (distortion) and the surface roughness of the outer diameter side ball screw grooves 8, 8 are to be corrected only by the finishing machining, it is inevitable that the grinding amount or polishing amount by the grinding stone increases and the processing cost increases.

In contrast, in the present embodiment, after the heat treatment is applied to the ball nut 3, the burnishing process is preformed to press the processing balls 12, 12, which are made of a material harder than the metal material configuring the surfaces of the outer diameter side ball screw grooves 8, 8 hardened by the heat treatment, against each of the outer diameter side ball screw grooves 8, 8 while being brought into rolling contact with each of the outer diameter side ball screw grooves 8, 8. Accordingly, a surface property of each of the outer diameter side ball screw grooves 8, 8 can be adjusted while denting the surface of each of the outer diameter side ball screw grooves 8, 8, the surface modification, the deformation and the surface roughness of the outer diameter side ball screw grooves 8, 8 can be efficiently corrected. Therefore, the finishing machining can be omitted, or can be simplified when it is applied. As a result, it is possible to suppress the processing cost of each of the outer diameter side ball screw grooves 8, 8, and consequently manufacturing cost of the ball nut 3.

Similar to the outer diameter side ball screw grooves 8, 8, in a case where a portion to be processed, which is spirally formed on the inner circumferential surface of the ball nut 3, is subjected to finishing machining such as grinding or polishing with a grinding stone, and superfinishing, the grinding stone is pressed against the other circumferential end portion (the starting end portion) of each of the outer diameter side ball screw grooves 8, 8, (the ball rolling groove portion 9 configuring each of the outer diameter side ball screw grooves 8, 8), and the ball nut 3 is displaced in the axial direction while being rotated. Further, after grinding or polishing to one circumferential end portion (the terminal end portion) of each of the outer diameter side ball screw grooves 8, 8, a direction of the displacement in the rotation direction and the axial direction of the ball nut 3 are reversed, and the other circumferential end portion is ground or polished. In this way, it is necessary to grind or polish the outer diameter side ball screw grooves 8, 8 while reciprocally moving (reciprocally displacing) the ball nut 3, so that the processing for the outer diameter side ball screw grooves 8, 8 becomes troublesome, and the processing cost of the outer diameter side ball screw grooves 8, 8 increases.

In contrast, in the present embodiment, the outer diameter side ball screw grooves 8, 8 can be burnished by merely displacing the mandrel 13 in the other axial direction while rotating the mandrel 13 in the predetermined direction. From this viewpoint, it is possible to suppress the processing cost of each of the outer diameter side ball screw grooves 8, 8, and consequently manufacturing cost of the ball nut 3.

Figure 5:
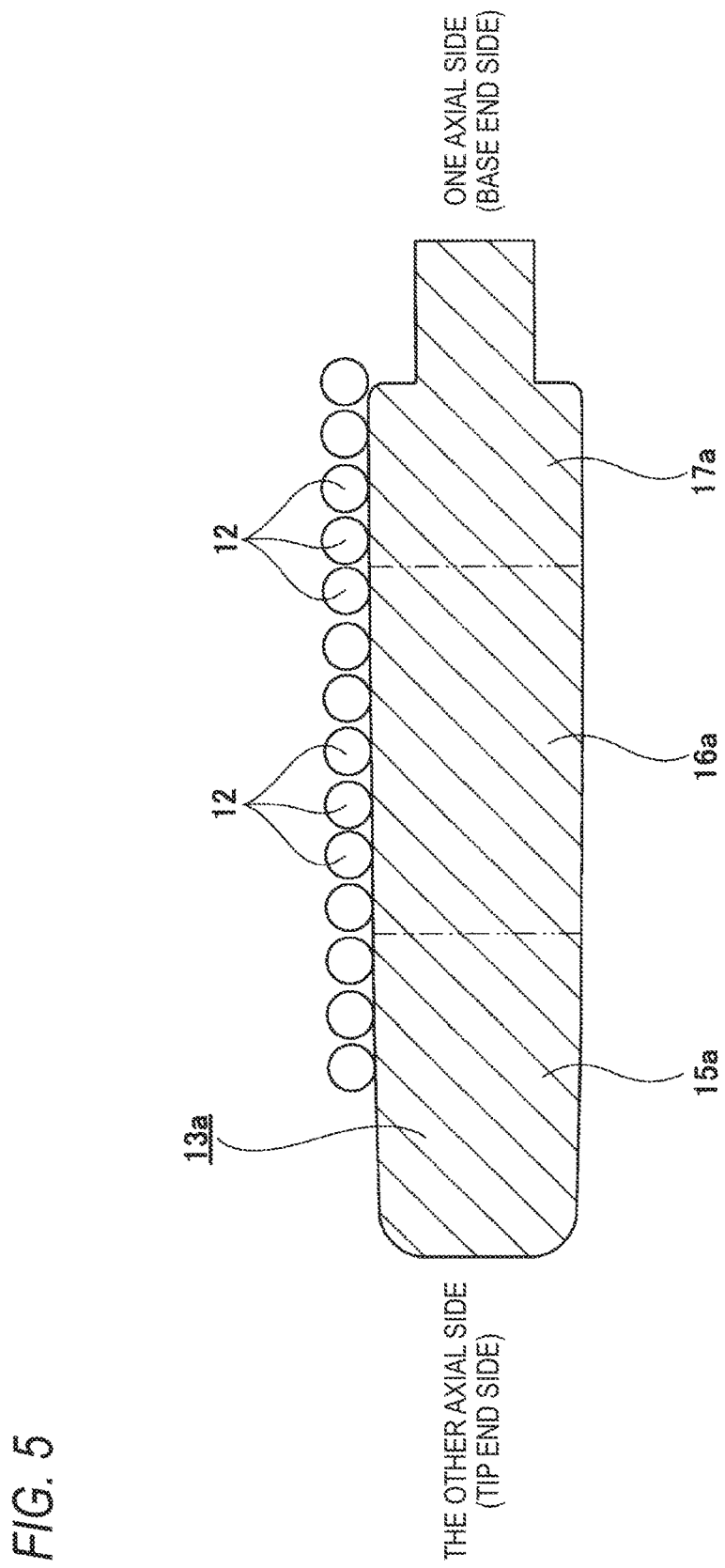
FIG. 5 is a sectional view showing another example of a mandrel.

In the above-described first embodiment, as the mandrel 13, at a portion from one axial end side portion of the introduction portion 15 to one axial end edge of the finishing portion 17, a mandrel is spirally provided with the tool side ball screw groove 14 having a partial circular arc shaped cross section is used. However, according to a method for manufacturing a raceway groove of the present invention, as shown in FIG. 5, when the outer diameter side ball screw grooves 8, 8 of the ball nut 3 are burnished, a mandrel 13a without providing the tool side ball screw groove on the outer circumferential surface thereof can also be used. Namely, in the case where the shape accuracy of each of the outer diameter side ball screw grooves 8, 8 formed by the cutting process is comparatively good, or in the case where a denting amount of the surface of each of the outer diameter side ball screw grooves 8, 8 by the burnishing process is small, the axial positioning accuracy of the processing balls 12, 12 can be sufficiently secured by the outer diameter side ball screw grooves 8, 8. The mandrel 13*a* is provided with an introduction portion 15*a* at a tip end portion, a main processing portion 16*a* at an axial intermediate portion, and the finishing portion 17*a* at a base end portion, respectively. Further, an outer diameter of a portion from a tip end edge of the introduction portion 15*a* to one axial end edge of the main processing portion 16*a* is gradually enlarged toward one axial side. Additionally, an outer diameter of a portion positioned at one axial end edge of the introduction portion 15*a* is made smaller than the diameter of the inscribed circle of each of the processing balls 12, 12 held in each of the outer diameter side ball screw grooves 8, 8.

Second Embodiment

Figure 6:
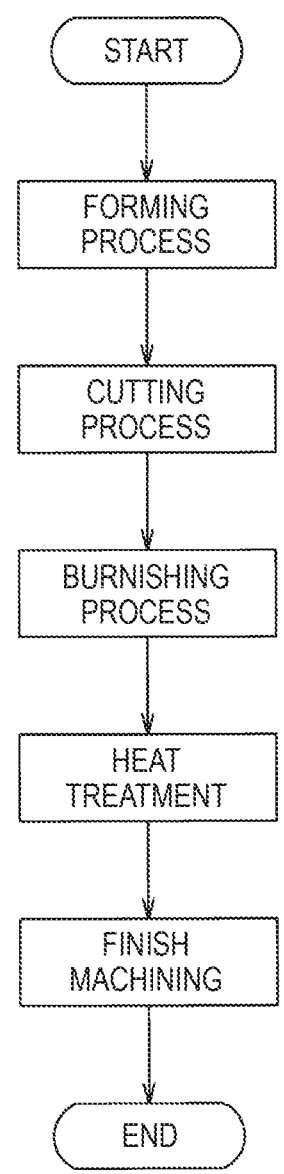
FIG. 6 is a view similar to FIG. 4, showing a second embodiment of the present invention.

A second embodiment will be described with reference to FIG. 6 in addition to FIGS. 1 and 2. In the first embodiment, after the outer diameter side ball screw grooves 8, 8 are formed by the cutting process, and after the heat treatment is applied, the burnishing process is performed to press the processing balls 12, 12 against each of the outer diameter side ball screw grooves 8, 8, whereas in the second embodiment, before the heat treatment is applied and after the outer diameter side ball screw grooves 8, 8 are formed by the cutting process, the outer diameter side ball screw grooves 8, 8 are subjected to the burnishing process.

Namely, in the present embodiment, in order to manufacture the ball nut 3 of the ball screw device 1, by subjecting a metal material such as carbon steel to a forming process such as casting or forging, a substantially cylindrical intermediate material is obtained. By a cutting process such as lathe turning using a planet cutter (planet tap), the ball rolling groove portion 9 configuring each of the outer diameter side ball screw grooves 8, 8 is formed on an inner circumferential surface of the intermediate material while leaving a certain denting margin. Subsequently, the piece 7 including the ball return groove portion 10 having a substantially S shape on the inner circumferential surface, which is prepared separately from the intermediate material, is fitted and fixed into each of the substantially oblong-shaped through holes provided at a plurality of positions of the intermediate material.

Next, each of the outer diameter side ball screw grooves 8, 8 is subjected to the burnishing process. A method of performing the burnishing process on each of the outer diameter side ball screw grooves 8, 8 is the same as the case of the first embodiment. Namely, for example, grease is applied to each of the outer diameter side ball screw grooves 8, 8, and the plurality of processing balls 12, 12 are arranged in each of the outer diameter side ball screw grooves 8, 8 for each outer diameter side ball screw grooves 8, 8. Furthermore, the ball nut 3 is supported by a processing device in a state of preventing axial displacement and rotation. The mandrel 13, which has the circular cross section and the linear rod shape, and is spirally provided with the tool side ball screw groove 14 on the outer circumferential surface, is inserted into the inner diameter side of the supported ball nut 3 from the opening on one axial side of the ball nut 3 while being rotated in a predetermined direction. The mandrel 13 is displaced toward the other axial direction while being rotated in the predetermined direction from a state in which the tip end portion (the other axial end portion) thereof is inserted to the inner diameter side of the ball nut 3. Each of the processing balls 12, 12 rolls while circulating between each of the outer diameter side ball screw grooves 8, 8 and the tool side ball screw groove 14. As described above, each of the outer diameter side ball screw grooves 8, 8 is subjected to the burnishing process.

After the burnishing process, the ball nut 3 is displaced in one axial direction (a direction in which the insertion amount of the mandrel 13 into the ball nut 3 decreases) while rotating the mandrel 13 in a direction opposite to the predetermined direction, and the mandrel 13 is pulled out from the inner diameter side of the ball nut 3. Subsequently, each of the processing ball 12, 12 is taken out from each of the outer diameter side ball screw grooves 8, 8, and cleaning or the like is performed as necessary. Moreover, the ball nut 3 is subjected to the heat treatment such as quenching or tempering, and is further subjected to finishing machining such as grinding, polishing, or superfinishing.

In the present embodiment, after the outer diameter side ball screw grooves 8, 8 are formed by the cutting process and before the ball nut 3 is subjected to the heat treatment, the outer diameter side ball screw grooves 8, 8 are subjected to the burnishing process. By performing the burnishing process between the cutting process and the heat treatment as describe above (before the outer diameter side ball screw grooves 8, 8 are hardened by the heat treatment), it is possible to remove tear caused in each of the outer diameter side ball screw grooves 8, 8 and to correct (reduce a load required for the deformation) the deformation similarly efficiently during the cutting process which is the previous step of the burnishing process. Therefore, it is possible to simplify the finishing machining which is a process after the burnishing process (it is possible to reduce a grinding amount or a polishing amount), shorten the time of the burnishing process and downsize the processing device, and reduce the processing cost of each of the outer diameter side ball screw grooves 8, 8 and consequently the manufacturing cost of the ball nut 3.

Other configurations and operational effects of the second embodiment are the same as those in the first embodiment.

INDUSTRIAL APPLICABILITY

In each of the above-described embodiments, a case where the outer diameter side ball screw groove is formed on the inner circumferential surface of the ball nut configuring the so-called piece type ball screw device has been described. However, the present invention is not limited to the ball nut configuring the so-called piece type ball screw device, and can also be applied to a ball nut configuring a so-called end cap type, return tube type, or guide plate type ball screw device where the outer diameter side ball screw groove is formed on the inner circumferential surface in a state of being a spiral shape and continuous over a plurality of circumferences. Further, the present invention can also be applied to a method for processing an inner diameter side ball screw groove which is formed on an outer circumferential surface of a ball screw shaft configuring the ball screw device in a state of being a spiral shape and continuous over a plurality of circumferences, an inner ring raceway which is formed on an outer circumferential surface of an inner ring configuring a rolling bearing, or an outer ring raceway which is formed on inner circumferential surface of an outer ring configuring the rolling bearing.

Figure 9:
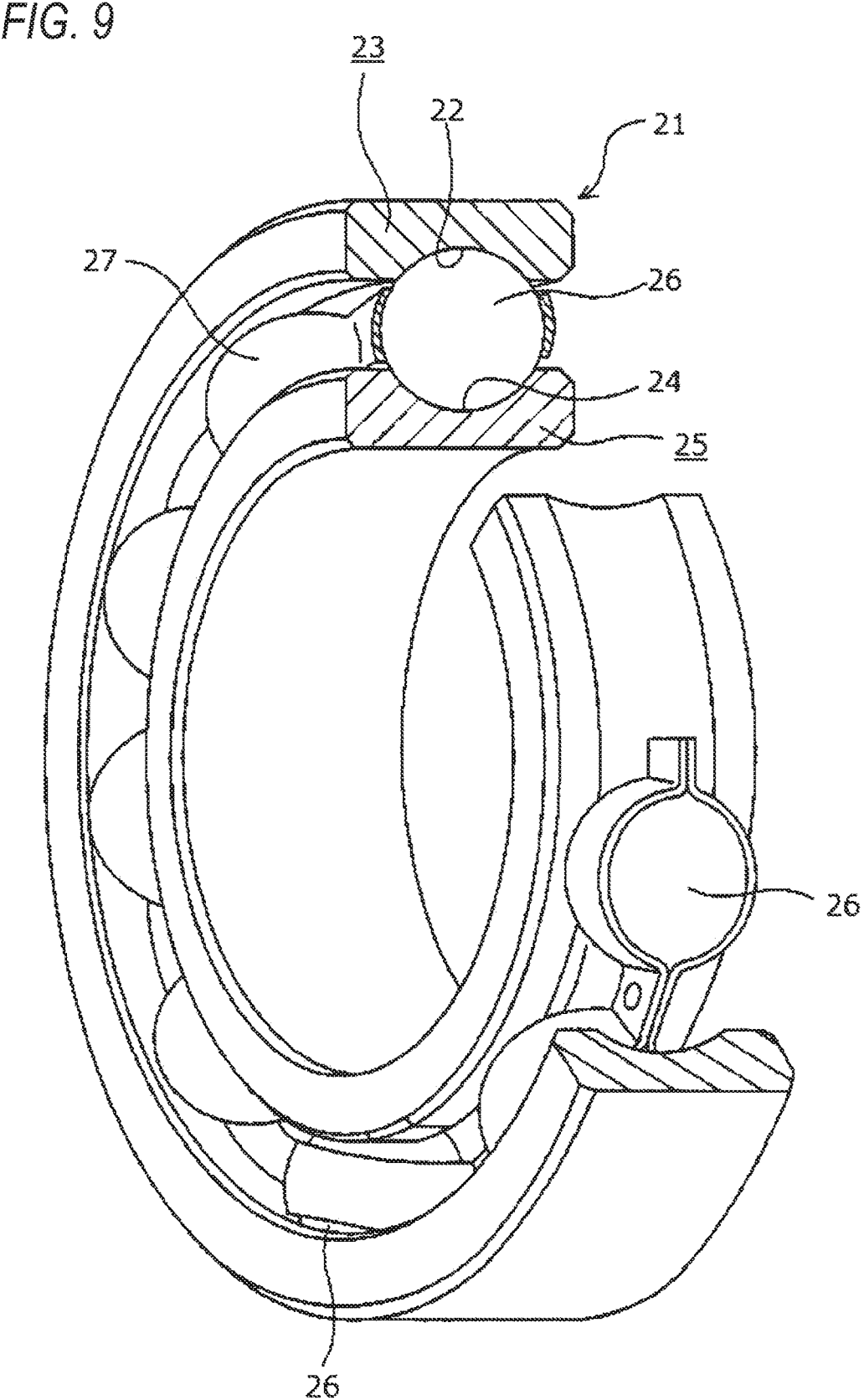
FIG. 9 is a partially cut perspective view of a radial ball bearing which is a type of bearing.

The present invention is, for example, applied to a radial ball bearing 21 shown in FIG. 9. The radial ball bearing 21 includes an outer ring 23 including an outer ring raceway 22 on an inner circumferential surface of the outer ring 23, an inner ring 25 including an inner ring raceway 24 on an outer circumferential surface of the inner ring 25, and a plurality of balls 26, 26 which are provided between the outer ring raceway 22 and the inner ring raceway 24 as rolling elements. Each of the balls 26, 26 is rotatably held by a holder 27 in a state of being arranged at equal intervals in the circumferential direction. The method for processing a raceway groove according to the present invention can also be applied to the radial ball bearing 21. A method for manufacturing the radial ball bearing 21 in this case can be expressed as follows. That is to say, there is provided a method for manufacturing the bearing 21 including the outer ring 23 provided with the outer ring raceway 22 on the inner circumferential surface of the outer ring 23, and the inner ring 25 provided with the inner ring raceway 24 on the outer circumferential surface of the inner ring 25, the outer ring raceway 22 of the outer ring 23 is a surface to be processed, and a to-be-processed side drive groove is formed on the surface to be processed by the method for processing a raceway groove of the present invention, and the inner ring raceway 24 of the inner ring 25 is the surface to be processed, and the to-be-processed side drive groove is formed on the surface to be processed by the method for processing a raceway groove of the present invention.

According to the present invention, there is a method for manufacturing a ball screw device including a ball nut, a ball screw shaft, and a plurality of balls, and an inner circumferential surface of the ball nut is a surface to be processed, and a to-be-processed side drive groove is formed on the surface to be processed by the method for processing a raceway groove of the present invention.

According to the present invention, there is provided a method for manufacturing a ball screw device including a ball nut, a ball screw shaft, and a plurality of balls, and an outer circumferential surface of the ball screw shaft is a surface to be processed, and a to-be-processed side drive groove is formed on the surface to be processed by the method for processing a raceway groove of the present invention.

According to the present invention, there is provided a method for manufacturing a machine including the above-described bearing, and the bearing is manufactured by the method for manufacturing a bearing.

According to the present invention, there is provided a method for manufacturing a machine including the above-described ball screw device, wherein the ball screw device is manufactured by the method for manufacturing a ball screw device.

Herein, the "machine" is not limited in the type of power. That is to say, the "machine" of the present invention includes both a machine operated by human power and a machine operated by power other than the human power.

According to the present invention, there is provided a method for manufacturing a vehicle including the above-described bearing, and the bearing is manufactured by the method for manufacturing a bearing.

Figure 10:
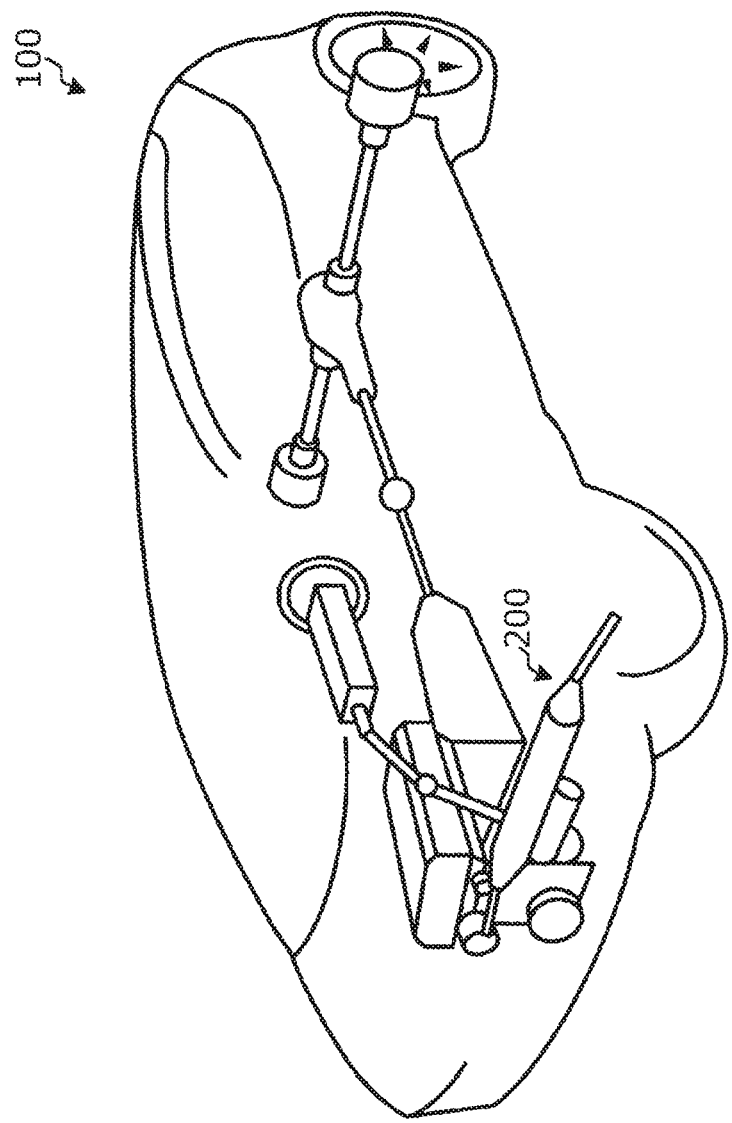
FIG. 10 is a schematic view of a vehicle equipped with an electric power steering apparatus including a ball screw device.

According to the present invention, there is provided a method for manufacturing a vehicle including the above-described ball screw device, the ball screw device is manufactured by the method for manufacturing a ball screw device. For example, as shown in FIG. 10, a vehicle 100 is equipped with an electric power steering apparatus 200 to which the above-described ball screw device is applied. The present application is based on Japanese Patent Application No. 2016-204621 filed on Oct. 18, 2016, the contents of which are incorporated herein by reference.

DESCRIPTION OF REFERENCE NUMERALS 1 ball screw device
2 ball screw shaft
3 ball nut
4 ball
5 inner diameter side ball screw groove
6 nut body
7 piece
8 outer diameter side ball screw groove
9 ball rolling groove portion
10 ball return groove portion
11 through hole
12 processing ball
13 mandrel
14 tool side ball screw groove
15, 15a introduction portion
16, 16a main processing portion
17, 17a finishing portion

The invention claimed is:

1. A method for processing a raceway groove configured to circumferentially form a to-be-processed side raceway groove on a surface to be processed of a workpiece, the to-be-processed side raceway groove being configured to be brought into rolling contact with a rolling element, and the surface to be processed being a cylindrical circumferential surface,
wherein the workpiece is a ball nut for a ball screw device which is spirally provided, on an inner circumferential surface of the ball nut as the surface to be processed, with an outer diameter side ball screw groove which is the to-be-processed side raceway groove and which has a partial circular arc shaped cross section,
a machining tool is a mandrel which outer circumferential surface is a cylindrical tool side circumferential surface, and
the method for processing a raceway groove comprising:
arranging a processing ball as a processing rolling element rotatably between the outer diameter side ball screw groove and the tool side circumferential surface of the mandrel which is opposed to the inner circumferential surface of the ball nut;
rotating the mandrel relatively with respect to the ball nut, and displacing the mandrel in an axial direction relatively with respect to the ball nut; and
performing a burnishing process on the outer diameter side ball screw groove,
wherein an outer diameter dimension of at least a part of the mandrel in the axial direction is gradually enlarged toward a rear in a direction of relative displacement in the axial direction of the mandrel with respect to the ball nut during the burnishing process.

2. The method for processing a raceway groove according to claim 1,
wherein after forming the to-be-processed side raceway groove on the surface to be processed by a cutting process, the to-be-processed side raceway groove is subjected to the burnishing process.

3. The method for processing a raceway groove according to claim 2,
wherein after the to-be-processed side raceway groove is formed on the surface to be processed by the cutting process, and further after heat treatment is applied to the workpiece, the to-be-processed side raceway groove is subjected to the burnishing process.

4. A method for manufacturing a ball screw device including a ball nut, a ball screw shaft, and a plurality of balls,
   wherein an inner circumferential surface of the ball nut is the surface to be processed, and the to-be-processed side drive groove is formed on the surface to be processed by the method for processing a raceway groove according to claim 1.

5. A method for manufacturing a machine including the ball screw device,
   wherein the ball screw device is manufactured by the method for manufacturing a ball screw device according to claim 4.

6. A method for manufacturing a ball screw device including a ball nut, a ball screw shaft, and a plurality of balls,
   wherein an outer circumferential surface of the ball screw shaft is the surface to be processed, and the to-be-processed side drive groove is formed on the surface to be processed by the method for processing a raceway groove according to claim 1.

7. A method for processing a raceway groove configured to circumferentially form a to-be-processed side raceway groove on a surface to be processed of a workpiece, the to-be-processed side raceway groove being configured to be brought into rolling contact with a rolling element, and the surface to be processed being a cylindrical circumferential surface,
   wherein the workpiece is a ball nut for a ball screw device which is spirally provided, on an inner circumferential surface of the ball nut as the surface to be processed, with an outer diameter side ball screw groove which is the to-be-processed side raceway groove and which has a partial circular arc shaped cross section,
   a machining tool is a mandrel which outer circumferential surface is a cylindrical tool side circumferential surface, and
   the method for processing a raceway groove comprising:
   arranging a processing ball as a processing rolling element rotatably between the outer diameter side ball screw groove and the tool side circumferential surface of the mandrel which is opposed to the inner circumferential surface of the ball nut;
   rotating the mandrel relatively with respect to the ball nut, and displacing the mandrel in an axial direction relatively with respect to the ball nut; and
   performing a burnishing process on the outer diameter side ball screw groove,
   wherein the outer circumferential surface of the mandrel is spirally provided with a tool side ball screw groove having a partial circular arc shaped cross section.

8. The method for processing a raceway groove according to claim 7,
   wherein a groove bottom diameter of the tool side ball screw groove is gradually enlarged toward the rear in the direction of a relative displacement in the axial direction of the mandrel with respect to the ball nut during the burnishing process.

9. A method for manufacturing a vehicle including the ball screw device,
   wherein the ball screw device is manufactured by the method for manufacturing a ball screw device according to claim 4.

* * * * *